(12) United States Patent
Rana et al.

(10) Patent No.: US 7,965,181 B2
(45) Date of Patent: *Jun. 21, 2011

(54) SYSTEM AND METHOD FOR ASSET TRACKING AND MONITORING USING ANTENNA DIVERSITY

(75) Inventors: Abdul H. Rana, Great Falls, VA (US); Dana Johnson, Oak Hill, VA (US)

(73) Assignee: SkyBitz, Inc., Sterling, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/627,527

(22) Filed: Nov. 30, 2009

(65) Prior Publication Data

US 2010/0073200 A1 Mar. 25, 2010

Related U.S. Application Data

(63) Continuation of application No. 11/757,645, filed on Jun. 4, 2007, now Pat. No. 7,646,295.

(51) Int. Cl.
*G08B 1/08* (2006.01)

(52) U.S. Cl. .................................. 340/539.13
(58) Field of Classification Search ............ 340/539.13, 340/539.22, 988, 539.26, 539.1, 568.1, 572.1, 340/825.49; 701/207, 213
See application file for complete search history.

(56) References Cited

U.S. PATENT DOCUMENTS

| 7,012,520 | B2* | 3/2006 | Webb, Sr. ............... 340/539.13 |
| 7,323,981 | B2* | 1/2008 | Peel et al. ............... 340/539.13 |
| 2005/0078649 | A1* | 4/2005 | Tehrani et al. ............ 370/343 |
| 2007/0273503 | A1* | 11/2007 | Twitchell, Jr. ............ 340/539.1 |

* cited by examiner

*Primary Examiner* — Phung Nguyen
(74) *Attorney, Agent, or Firm* — Duane S. Kobayashi

(57) ABSTRACT

A system and method for asset tracking and monitoring using antenna diversity. Antenna diversity ensures that the mobile terminal maintains good visibility of a satellite throughout the transport route. In one example, a first antenna is mounted on a first side of an asset transporter (e.g., flatbed trailer) and a second antenna is mounted on a second side of the asset transporter. A selector/combiner in the mobile terminal enables multiple antennas to be leveraged in the satellite communication process.

20 Claims, 3 Drawing Sheets

SYSTEM AND METHOD FOR ASSET TRACKING AND MONITORING USING ANTENNA DIVERSITY

This application is a continuation of non-provisional patent application Ser. No. 11/757,645, filed Jun. 4, 2007 now U.S. Pat. No. 7,646,295, which is incorporated by reference herein, in its entirety, for all purposes.

BACKGROUND

Field of the Invention

The present invention relates generally to tracking and monitoring and, more particularly, to a system and method for asset tracking and monitoring using antenna diversity.

Introduction

Tracking mobile assets represents a growing enterprise as companies seek increased visibility into the status of movable assets (e.g., trailers, containers, etc.). Visibility into the status of movable assets can be gained through mobile terminals that are affixed to the assets. These mobile terminals can be designed to generate position information that can be used to update status reports that are provided to customer representatives.

In a conventional tracking system, the mobile terminal is affixed to the roof of the trailer. This location of attachment ensures that the satellite receiver in the mobile terminal maintains good visibility throughout the transport route. In some asset transporters (e.g., flatbed trailer), the potential points of attachment of the mobile terminal are limited. For example, the mobile terminal may be attached to one side of the flatbed trailer. This attachment option is not ideal, however, because the load can obscure the visibility of the mobile terminal to the satellite. What is needed therefore is a mechanism that increases the quality of transmission/reception of mobile terminals that are affixed to asset transport systems that have limited points of attachment.

SUMMARY

A system and method asset tracking and monitoring using antenna diversity, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
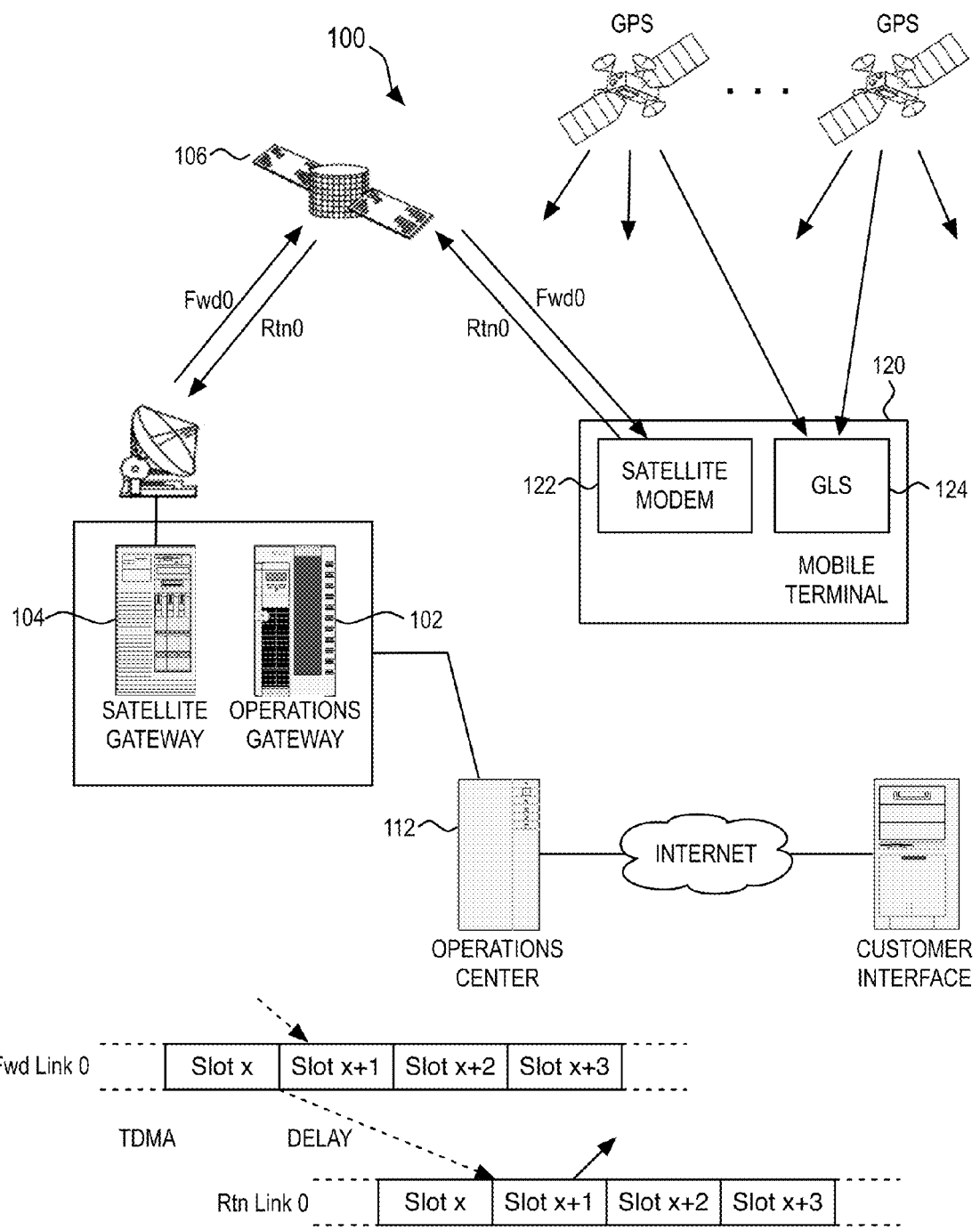
FIG. 1 illustrates an embodiment of a satellite network in communication with a mobile terminal on an asset.

FIG. 1 illustrates an embodiment of an asset tracking system that includes operations gateway 102, communicating with mobile terminal 120 on an asset (or asset transporter). As would be appreciated, the asset can be embodied in various forms such as a trailer, a railcar, a shipping container, or the like.

Communication between operations gateway 102 and mobile terminal 120 is facilitated by satellite gateway 104 at the ground station and satellite modem 122 in mobile terminal 120. Both satellite gateway 104 and satellite modem 122 facilitate communication using one forward and one return link (frequency) over communication satellite 106.

In one embodiment, the satellite communication is implemented in a time division multiple access (TDMA) structure, which consists of 57600 time slots each day, per frequency or link, where each slot is 1.5 seconds long. On the forward link, operations gateway 102 sends a message or packet to mobile terminal 120 on one of the 1.5 second slots. Upon receipt of this message or packet, mobile terminal 120 would then perform a GPS collection (e.g., code phase measurements) using global locating system (GLS) module 124 or to perform sensor measurements and transmit the data back to operations gateway 102 on the return link, on the same slot, delayed by a fixed time defined by the network. In one embodiment, the fixed delay defines a length of time that enables mobile terminal 120 to decode the forward packet, perform the data collection and processing, and build and transmit the return packet.

In one embodiment, mobile terminal 120 can be configured to produce periodic status reports. In this configuration, mobile terminal 120 would wake up periodically, search for its assigned forward slot, perform data collection and processing, and transmit the status report on the assigned return slot. In another embodiment, mobile terminal 120 can be configured to produce a status report upon an occurrence of an event (e.g., door opening, motion detected, sensor reading, etc.). In this configuration, mobile terminal 120 would wake up upon occurrence of an event, search for an available forward slot, perform data collection and processing, and transmit the status report on the return slot corresponding to the identified available forward slot.

Upon receipt of a status report from mobile terminal 120, operations gateway 102 passes the information to operations center 112. Operations center 112 can then use the received GPS collection to calculate a position solution. This position solution along with any other status information (both current and historical) can be passed to a customer via the Internet. A detailed description of this communications process is provided in U.S. Pat. No. 6,725,158, entitled "System and Method for Fast Acquisition Position Reporting Using Communication Satellite Range Measurement," which is incorporated herein by reference in its entirety.

In one embodiment, mobile terminal 120 can also collect sensor measurements from sensors (not shown) that are positioned at various points on the asset being tracked. In meeting the demand by customers for greater visibility into the status of assets, various sensor types can be used. For example, volume sensors, temperature sensors, chemical sensors, radiation sensors, weight sensors, light sensors, water sensors, etc. can be used to report the condition of cargo being transported or an environment of the asset. In another example, truck cab ID indicators, odometer sensors, wheel sensors, vibration sensors, etc. can be used to report the condition of the service vehicle. In general, these various sensors can be used to report status information or the occurrence of any events at the service vehicle to the mobile terminal for transmission to the centralized facility. The position information along with any sensor information can then be reported to the centralized facility periodically, upon request, or upon an occurrence of a detected event at the asset location. The transmission of sensor information from the sensors to mobile terminal 120 can be facilitated by wired or wireless connections.

Figure 2:
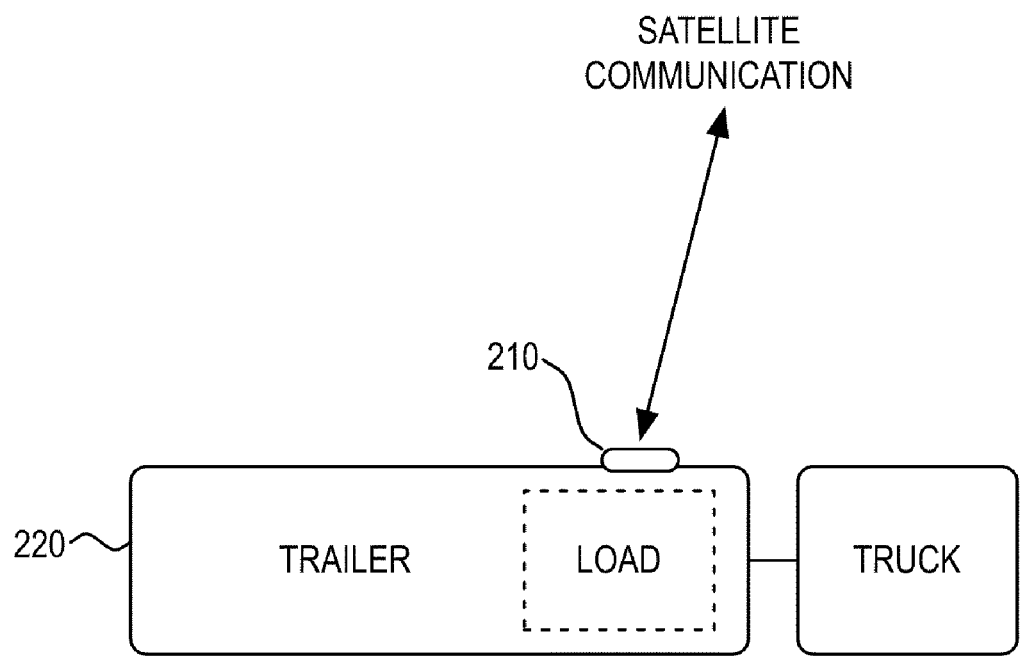
FIG. 2 illustrates a mobile terminal affixed to an asset.

Mobile terminals are often affixed to an asset at a location that facilitates good visibility to the satellites. FIG. 2 illustrates one example of mobile terminal placement on an asset such as trailer, which contains a load. In this illustrated example, mobile terminal 210 is affixed to a roof of trailer 220, which is pulled by a truck. At this roof position, the view of mobile terminal 210 to the various satellites is largely unobstructed. This unobstructed view enables mobile terminal 210 to maintain communications contact with the various satellites as it is routed to its destination.

Figure 3:
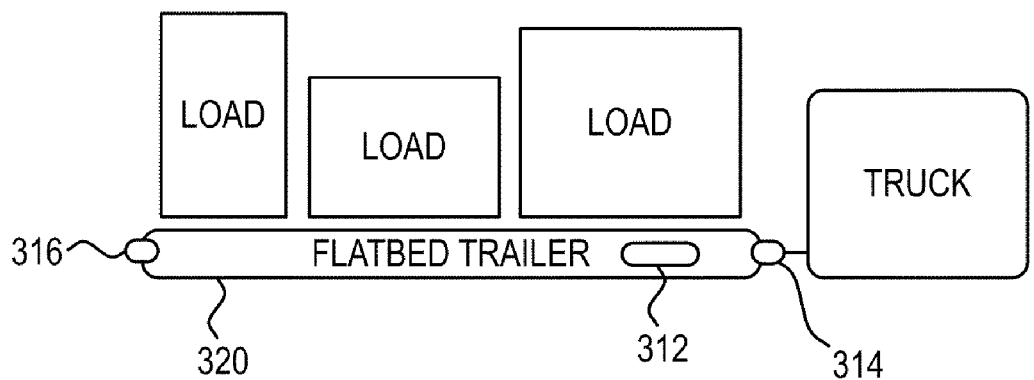
FIG. 3 illustrates a mobile terminal coupled to multiple antennas.

As compared to the trailer example of FIG. 2, some asset transporters have limited potential points of attachment of the mobile terminal. Consider for example an asset transporter such as a flatbed trailer. As illustrated in FIG. 3, flatbed trailer 320 does not have an enclosed structure for inclusion of the loads that it carries. Accordingly, attachment to an unobstructed rooftop position is not possible.

Potential attachment positions onto a flatbed trailer would be limited to side position 312 or front position 314. While rear position 316 is also possible, this position may be impractical to the higher likelihood of damage due to the potential incidences of contact during truck operation or loading/unloading. Regardless of the specific position (i.e., front, side, or rear) at which the mobile terminal is attached, the mobile terminal can experience reduced visibility to the various communication satellites due to the obstruction of the satellite view by the loads themselves. This obstructed visibility to the satellites can significantly impact the asset tracking and monitoring system's performance.

To increase the quality of transmission/reception of mobile terminals that are affixed to asset transporters that have limited points of attachment, multiple attachment positions are used. It is a feature of the present invention that these multiple attachment positions can be used to minimize the impact of having one side of the asset transporter with an obscured view. In combination, the multiple attachment positions can assure that at least one of the attachment positions has a relatively unobstructed view of the satellites. For example, if side position 312 and front position 314 are used, then it is likely that at least one of those positions would have a relatively unobstructed view regardless of the orientation of flatbed trailer 320. The same would be true if two opposing side positions were used.

Figure 4:
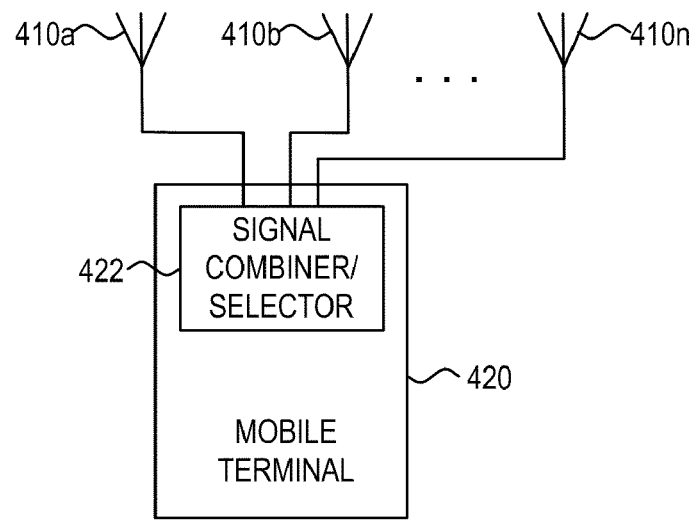
FIG. 4 illustrates an embodiment of antenna diversity on an asset.

In accordance with the present invention, multiple attachment positions on the asset transporter can be facilitated without a duplication of electronics in the mobile terminal. In one embodiment, the diversity in attachment positions is facilitated by the use of multiple antennas. As illustrated in FIG. 4, multiple antennas 410a-410n can be placed at different positions on the asset transporter and attached to a single mobile terminal 420. For example, antenna 410a can be placed on a first side of the asset transporter, antenna 410b can be placed on a second side of the asset transporter, and antenna 410n can be placed on a front side of the asset transporter. Further antennas can be used as required.

Each antenna 410a-410n can be coupled to mobile terminal 420 via a cable. If such is the case, then mobile terminal 420 can be located at a position distinct from each of antennas 410a-410n. For example, mobile terminal 420 can be placed underneath the asset transporter, or at a safe location on the side. This scenario could be used where damage to the mobile terminal is likely at any of the potential antenna placement positions. If an antenna position is considered safe for mobile terminal 420, then one of the antennas can be integrated with mobile terminal 420, thereby obviating the need for one of the cables.

In one embodiment, multiple antennas 410a-410n are attached to mobile terminal 420 via signal combiner/selector 422. In general signal combiner/selector 422 is designed to leverage the antenna diversity that is on the asset transporter. This antenna diversity is designed to reduce the impact of obstruction of satellite visibility due to a particular orientation of the asset transporter. In one scenario, signal combiner/selector 422 can be configured to use the antenna that has the strongest received signal. In another scenario, signal combiner/selector 422 can be configured to combine the signals received from the multiple antennas to produce a more reliable signal. As would be appreciated, the specific mechanism of combining/selecting implemented by signal combiner/selector 422 would be implementation dependent.

Figure 5:
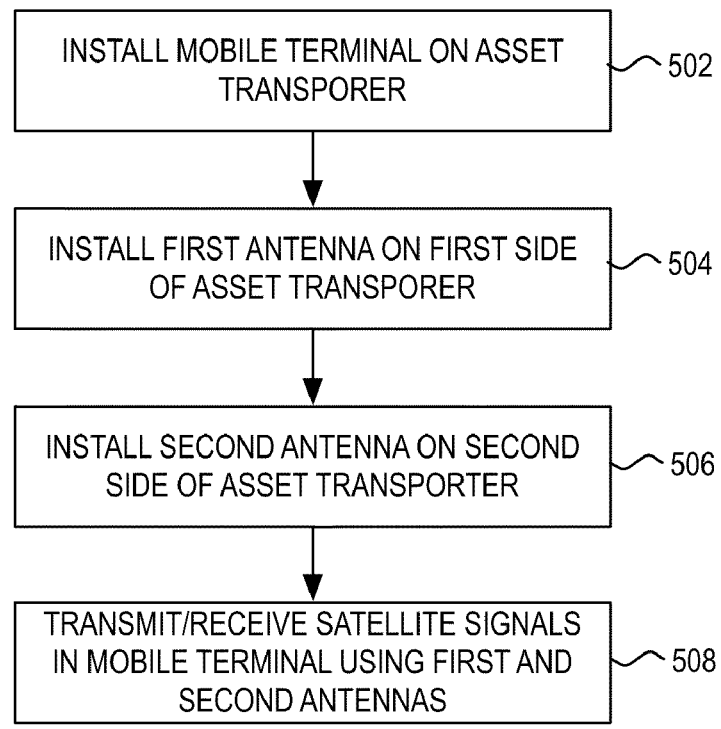
FIG. 5 illustrates a flowchart of a process for enabling antenna diversity with a mobile terminal.

To illustrate the operation of the present invention, reference is now made to the flowchart of FIG. 5. As illustrated, the process begins at step 502 where a mobile terminal is installed on an asset transporter. Here, the location of installation would be dependent on the potential for damage of the mobile terminal. For example, if a side position is considered, then the mobile terminal form factor would need to be sufficiently small to reduce the likelihood of damage. Larger mobile terminal form factors could likely be accommodated on a front position. If no position with satellite visibility is suitable, then the mobile terminal can be installed in a safe, but obscured position.

At step 504, a first antenna is installed on a first side of the asset transporter. This first antenna can be integrated with the mobile terminal if the first side position is considered sufficiently safe for the mobile terminal. If the first antenna position is not safe for the mobile terminal, then the first antenna is coupled to the mobile terminal with a cable. At step 506, a second antenna is installed on a second side of the asset transporter. In general, this second position is chosen to provide a measure of antenna diversity to enhance signal transmission. Where, the asset transporter features a curved side profile, for example, the second antenna position could be located on a second position of the same "side."

Once multiple (i.e., two or more) antennas are installed on different respective positions on the asset transporter, multiple antennas can then be used by the mobile terminal for satellite communication at step 508. As noted, this usage of multiple antennas can be based on some form of selection or combination. The impact of the relative obstruction of any one of the multiple antennas is thereby minimized.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An asset tracking system for use on an asset transporter carrying an asset load, comprising:
   a mobile terminal that is affixed to said asset transporter at a location on said asset transporter whose visibility to a satellite is obscured by said asset load when said asset transporter is in a particular orientation;
   a first antenna coupled to said mobile terminal for receiving signals from said satellite, said first antenna being positioned on a first side of said asset transporter; and
   a second antenna coupled to said mobile terminal for receiving signals from said satellite, said second antenna being positioned on a second side of said asset transporter different from said first side, said positioning of said first antenna on said first side of said asset transporter and said second antenna on said second side of said asset transporter assuring that at least one of said first and second antennas has a relatively unobstructed view of said satellite regardless of an orientation of said asset transporter relative to said satellite.

2. The system of claim 1, wherein said first antenna is integrated with said mobile terminal.

3. The system of claim 2, wherein said second antenna is coupled to said mobile terminal via a cable.

4. The system of claim 1, wherein said mobile terminal includes a signal selector that selects a satellite signal from one of said first and said second antenna.

5. The system of claim 4, wherein said selection is based on signal strength.

6. The system of claim 1, wherein said mobile terminal includes a signal combiner that combines satellite signals received from said first and said second antenna.

7. The system of claim 1, wherein said satellite signal is received from a communication satellite.

8. The system of claim 1, wherein said satellite signal is received from a GPS satellite.

9. A mobile terminal for use with an asset tracking and monitoring system, said mobile terminal being affixed to an asset transporter at a position whose visibility to a satellite can be obscured by an asset load on said asset transporter, comprising:
   an antenna port for connection to a first antenna for receiving signals from said satellite, said first antenna being positioned on a first side of said asset transporter that is different from a second side of said asset transporter on which a second antenna is mounted, said positioning of said first antenna on said first side of said asset transporter and said second antenna on said second side of said asset transporter enabling at least one of said first and second antennas to have a relatively unobstructed view of said satellite regardless of an orientation of said asset transporter; and
   a satellite receiver that is coupled to said first and said second antennas, said satellite receiver having an increased visibility to said satellite as compared to a visibility provided by one of said first and said second antennas.

10. The mobile terminal of claim 9, further comprising a signal selector that selects signals received by one of said first and said second antennas.

11. The mobile terminal of claim 9, further comprising a signal combiner that selects signals received by one of said first and said second antennas.

12. The mobile terminal of claim 9, wherein said asset transporter is a flatbed trailer.

13. An asset tracking method in a mobile terminal that is affixed to an asset transporter at a position whose visibility to a satellite can be obscured by an asset load on said asset transporter, comprising:
   receiving, in a satellite receiver, first satellite signals received by a first antenna affixed to a first side of said asset transporter;
   receiving, in said satellite receiver, second satellite signals received by a second antenna affixed to a second side of said asset transporter, said first side of said asset transporter being different from said first side of said asset transporter; and
   processing at least one of said first satellite signals and said second satellite signals in said satellite receiver, wherein said positioning of said first antenna on said first side of said asset transporter and said second antenna on said second side of said asset transporter enables said first antenna to have a relatively unobstructed view of said satellite when said asset load obscures a view by said second antenna to said satellite.

14. The method of claim 13, wherein said first antenna is integrated with said mobile terminal.

15. The method of claim 14, wherein said second antenna is coupled to said mobile terminal via a cable.

16. The method of claim 13, further comprising selecting a satellite signal from one of said first and said second antenna.

17. The method of claim 16, wherein said selecting comprises selecting based on signal strength.

18. The method of claim 13, further comprising combining satellite signals received from said first and said second antenna.

19. The method of claim 13, wherein said receiving comprises receiving from a communication satellite.

20. The method of claim 13, wherein said receiving comprises receiving from a GPS satellite, and further comprising transmitting on a communications satellite.

* * * * *